Patented Feb. 5, 1929.

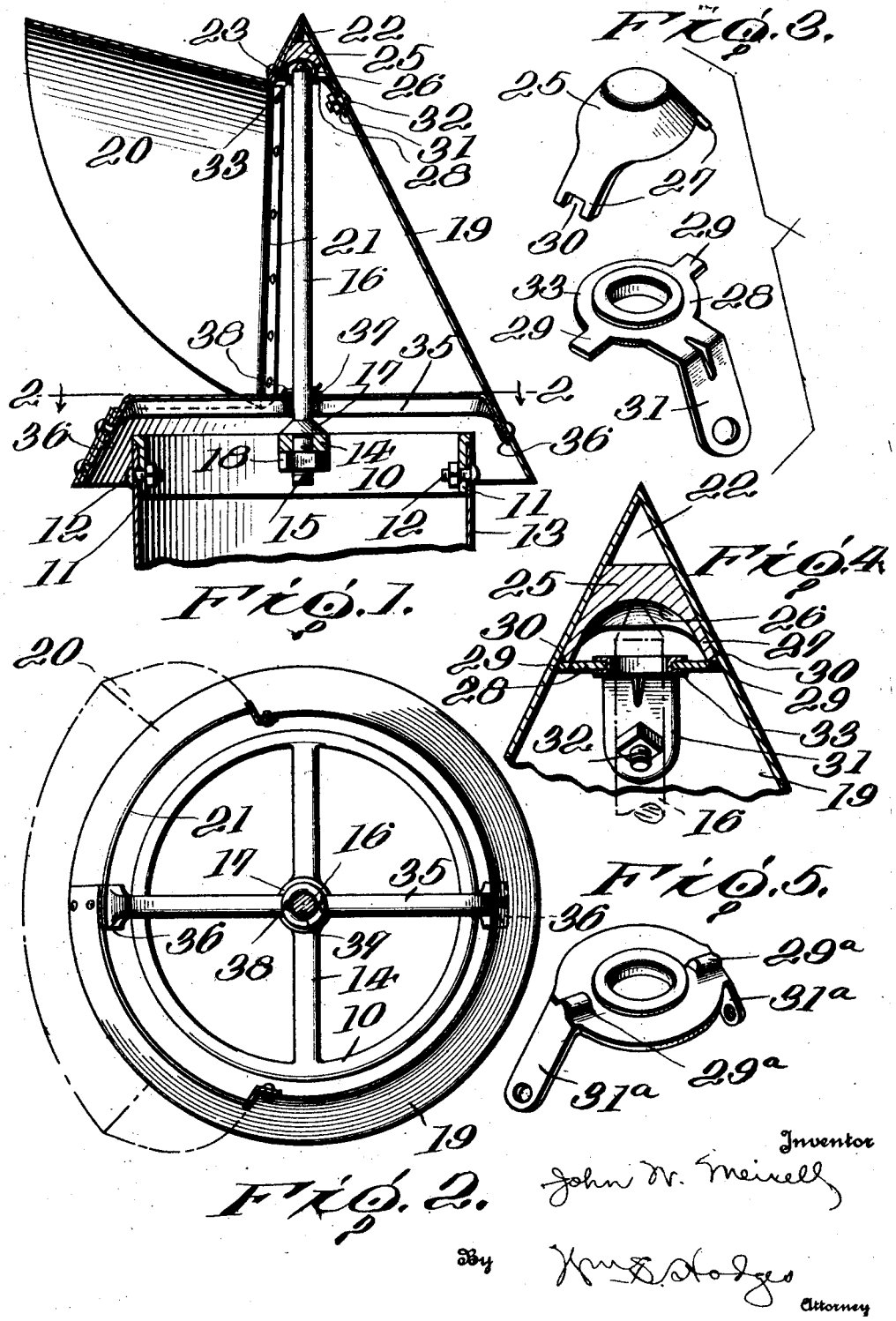

1,701,385

UNITED STATES PATENT OFFICE.

JOHN W. MEIXELL, OF LEWISBURG, PENNSYLVANIA.

VENTILATOR.

Application filed December 4, 1925. Serial No. 73,182.

This invention is a ventilator of the revolving type designed for use on chimneys, and buildings.

One of the objects of the invention is to provide a ventilator of the type mentioned which will be nicely balanced, and of design and strength to withstand the wind pressures to which it is normally exposed. A further object is to provide simple and very efficient means for rotatably mounting the ventilator, and reducing to a minimum the friction incident to its rotation. A further object is to provide a ventilator in which normally waste space is utilized to receive, and retain the bearing upon which the entire ventilator rotates. A further object is to provide means for preventing squeaking of the rotating parts without the use of lubricant. A further object is to provide a ventilator of the character mentioned in which the bearing and the brace members are readily detachable and removable.

The invention will be hereinafter fully set forth and particularly pointed out in the claims.

In the accompanying drawings:—

Figure 1 is a longitudinal sectional view illustrating a ventilator constructed in accordance with the invention. Figure 2 is a horizontal sectional view on the line 2—2, Figure 1. Figure 3 is an enlarged perspective view illustrating the top bearing and its anchoring member. Figure 4 is a longitudinal sectional view. Figure 5 is a view illustrating a modified form of anchoring bushing.

Referring to the drawing, 10 designates a supporting base provided with slots 11, to receive bolts 12, by means of which the base may be removably secured to a chimney or stack 13. Said base 10 is provided with a cross piece 14, having a central opening, through which is inserted a threaded shank 15, of the spindle 16. Said spindle is provided with a flange 17 resting upon the cross piece 14, a nut 18 serving to retain said spindle in place.

The rotatable ventilator member consists of a cone shape body 19, provided with the usual opening and adjacent wings 20, on the opposite sides of the opening 21. The apex of the body is provided with a cone shape chamber 22, extending above the plane of the union of the wings with the body. It is preferred to make the base of the body of a diameter approximately equal to the distance from the base to the apex, so that a vertical plane through the apex will assume the form of an equilateral triangle. This tends to lower the center of gravity and greatly improves the balance and equilibrium of the ventilator when in operation.

In order to substantially add to the stiffness of the ventilator body, the edges of the metal forming the conical apex are riveted together, as indicated at 23.

Removably located within the chamber 22 is a bearing member 25 of frusto-conical contour, provided with a concaved inner bearing surface 26, and with depending arms 27. Said bearing member is retained in place by means of a ring-like anchoring member 28, provided with peripheral lugs 29 positioned to engage complemental recesses 30 formed in the ends of arms 27. Said anchoring member is provided with an arm 31 having an opening for a bolt 32 by means of which the anchoring member is held in position. Beaded, or otherwise secured within the opening of the anchor member 28 is an antifriction bushing 33 of any desired material which will produce a non-squeak bearing for the ventilator.

If desired, the anchor member may be constructed with two anchoring arms 31ᵃ, as illustrated in Figure 5 in which event the ring-like body is provided with struck up portions 29ᵃ to engage the recesses 30.

The lower portion of the body 19 is braced by a transversely disposed rigid bar 35, the ends of which are riveted or otherwise secured to said body. The bar is preferably made of channel form in cross section, having ears 36 by means of which it is secured in place. Said brace bar is provided with an enlargement having an opening to receive the spindle 16. Said opening is provided with an antifriction bushing 37 similar to the bushing 33. It will be noted that one of the ears 36 of the bar 35 is secured to a portion of the ventilator body below the opening, so as to brace and reenforce the structure at this point, and thereby compensate for any weakness incidental to the removal of the metal in forming said opening.

In operation, the base or support 14 is placed in position over the chimney or stack 13, with the spindle 16 projecting upwardly. The ventilator body is then placed in position by passing the spindle through the bushings 37 and 33, until the pointed end of the spindle comes into contact with the inner concaved surface of the bearing member 25. A cotter pin 38, or some similar device is passed through a suitable opening in the spindle immediately above the brace bar 35 to retain the ventilator in place, the weight being carried on the end of the spindle or gudgeon.

The advantages of the invention will be readily apparent to those skilled in the art. It will be noted that by making the ventilator body with its base of a diameter equal to the distance from the base to the apex, the center of gravity is so placed that the said body will be nicely balanced on the spindle. An important advantage is that by reducing the upper end of the spindle to a point, and causing the weight to be supported by said point coming in contact with an almost flat surface, such as is provided by the inner portion of the bearing member 25, a minimum of contact surfaces between the parts is provided with a consequent material reduction in friction. By providing the bearing member with depending arms an open space is provided between the anchor ring and the bearing member, said space being of sufficient volume to prevent accumulation of soot and other dirt upon the bearing in sufficient quantities to interfere with the rotation of the device. By riveting the meeting edges of the cone-like tip of the ventilator the entire ventilator body is greatly stiffened and a rigid pocket for the bearing member is provided. By providing the bearings with non-squeak bushings the common annoyance of squeaking incident to the operation of devices of this kind, is avoided.

Having thus explained the nature of the invention and described an operative manner of constructing and using the same, although without attempting to set forth all of the forms in which it may be made, or all of the forms of its use, what is claimed is:—

1. A ventilator of the character described comprising a supporting base provided with a spindle, a ventilator body provided with a cone-like chamber at its apex, an anchor member carried by the ventilator body and extending across the lower portion of said chamber, a frusto-conical bearing member fitting within said chamber and having its lower portion in engagement with said anchor member, said bearing member resting upon the upper end of said spindle, said bearing member and said anchor member having complemental interengaging means to prevent rotation of the bearing member, and means at the lower portion of said body for maintaining it in concentric relation with said spindle.

2. A ventilator of the character described comprising a supporting base provided with a spindle, a ventilator body provided with a cone-like chamber at its top, a bearing fitting within said chamber and positioned to rest upon the upper end of said spindle, a ring-like anchor member having means engaging said bearing to prevent rotation thereof, means for holding said anchor member stationary, and means for maintaining the lower portion of said body in concentric relation with said spindle.

3. A ventilator of the character described comprising a supporting base provided with a spindle, a ventilator body provided with a cone-like chamber at its top, a bearing fitting within said chamber and positioned to rest upon the upper end of said spindle, said bearing member having depending arms, an anchor member having portions engaging said arms to prevent rotation of said bearing, means for holding said anchor member stationary, and means for maintaining the lower portion of said body in concentric relation with said spindle.

4. A ventilator of the character described comprising a supporting base provided with a spindle, a ventilator body provided with a cone-like chamber at its top, a bearing fitting within said chamber and positioned to rest upon the upper end of said spindle, said bearing member having depending arms provided with notches, an anchor member having portions complemental to said notches, means for holding said anchor member stationary, and means for maintaining the lower portion of said body in concentric relation with said spindle.

5. A ventilator of the character described comprising a supporting base provided with a spindle, a ventilator body provided with a cone-like chamber at its top, a bearing fitting within said chamber and positioned to rest upon the upper end of said spindle, a ring-like anchor member having means engaging said bearing to prevent rotation thereof, said anchor member having a depending arm, means for securing said arm to said body, and means for maintaining the lower portion of said body in concentric relation with said spindle 6. A ventilator of the character described comprising a supporting base provided with a spindle, a ventilator body provided with a cone-like chamber at its top, a bearing fitting within said chamber and positioned to rest upon the upper end of said spindle, a ring-like anchor member having means engaging said bearing to prevent rotation thereof, means for holding said anchor member stationary, an anti-squeak bushing secured within the opening of said anchor member, means for maintaining the lower portion of said body in concentric relation with said spindle.

7. A ventilator of the character described comprising a spindle, means for supporting the same, a ventilator body, an anchor member located within said body and having a portion extending diametrically thereacross, a frusto-conical bearing located within and supporting said body and having a concave inner surface resting upon the upper end of said spindle, the lower portion of said bearing being in engagement with the extended portion of said anchor member, means for holding said anchor member stationary, and means for maintaining the lower portion of said body in concentric relation with said spindle.

8. A ventilator of the character described comprising a spindle, means for supporting the same, a ventilator body, an anchor member located within said ventilator body, a frusto-conical bearing supporting said body and having a concave inner surface resting upon the upper end of the spindle, said bearing member having depending portions engaging said anchoring member so as to provide an open sided chamber between them to prevent accumulations of foreign substances, means for holding said anchor member stationary, and means for maintaining the lower portion of said ventilator body in concentric relation with said spindle.

9. A ventilator of the character described comprising a spindle, means for supporting the same, a ventilator body having a cone-like chamber at its top, means uniting the meeting edges of the material forming said chamber, an anchor member having a portion extended across the bottom of said chamber, means for retaining said anchor member in place, a frusto-conical bearing member complemental to said chamber and having its lower portion engaging the extended portion of said anchor member, said bearing member having a bearing surface of greater diameter than the upper end of the spindle upon which it rests, and means for maintaining the lower portion of said body in concentric relation with said spindle.

10. A ventilator of the character described comprising a spindle, means for supporting the spindle, a ventilator body of conical form, the diameter of the bottom portion of said body being approximately equal to the distance from the base to the apex of the body, said body having an opening above the base and wings adjacent to said opening, a bearing member in the top of said body resting upon the contiguous end of said spindle, and a channel-like brace bar having flattened downwardly extended ears secured to the lower portion of said ventilator body, said brace bar having an opening intermediate between its ends to receive said spindle, one end of said brace bar being secured to that portion of the ventilator body which is immediately below said opening, so as to reenforce the same.

11. A ventilator of the character described comprising a spindle, means for supporting the spindle, a ventilator body having a bearing member in its top resting upon the contiguous end of said spindle, an anchor member for said bearing member, said anchor member having an anti-squeak bushing engaging said spindle, a channel-like brace bar having ears secured to the lower portion of said body, said brace bar having an opening to receive said spindle, and a non-squeak bushing carried by said brace bar.

JOHN W. MEIXELL.